3,192,214
BASIC ANILIDE DERIVATIVES
John Krapcho, Somerset, N.J., assignor to Olin Mathieson Chemical Corporation, New York, N.Y., a corporation of Virginia
No Drawing. Filed Oct. 12, 1962, Ser. No. 230,276
7 Claims. (Cl. 260—253)

This invention relates to bases of the formula

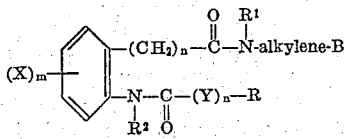

(I)

and to acid addition salts and quaternary ammonium salts thereof.

The symbols in Formula I have the following meanings:

B represents a basic nitrogen containing radical of less than 12 carbon atoms;
R represents hydrogen, lower alkyl, cycloalkyl, $(X)_m$-phenyl, furyl, thienyl, pyridyl and piperonyl;
$R^1$ and $R^2$ each represents hydrogen, lower alkyl, lower alkenyl and aralkyl;
X represents hydrogen, halo, lower alkyl, lower alkoxy, lower alkanoyl, trihalomethyl, hydroxy, and nitro;
Y represents lower alkylene, lower alkenylene, lower alkynylene and lower alkadienylene;
m represents 1, 2 and 3; and
n represents 0, 1 and 2.

The lower alkyl groups represented by R, $R^1$ and X include straight and branched chain saturated aliphatic groups such as methyl, ethyl, propyl, isopropyl, butyl, isobutyl, t-butyl, amyl, isoamyl, hexyl and the like. Methyl and ethyl are preferred. The lower alkoxy groups contain alkyl groups of the same character attached to the oxygen atom. Similarly, the lower alkylene groups represented by Y are divalent radicals of the same kind. The term "alkylene" includes such straight and branched chain aliphatic groups having up to about 14 carbon atoms, but lower alkylene groups are preferred. The lower alkenyl groups represented by $R^1$ are monounsaturated groups corresponding to the lower alkyl groups and include, for example, propenyl, isopropenyl, butenyl, isobutenyl and the like.

The unsaturated groups represented by Y are divalent straight or branched chain groups containing one carbon to carbon double bond (lower alkenylene), two carbon to carbon double bonds or one carbon to carbon triple bond (lower alkynylene) illustrated by the following:

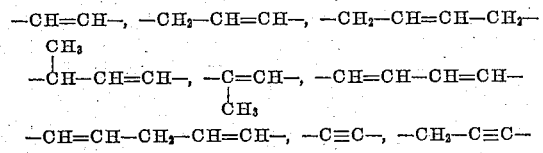

and the like.

Each of the four halogens is contemplated by the terms "halo" and "trihalomethyl," but in the case of the halogens themselves chlorine and bromine are preferred while trifluoromethyl is the preferred trihalomethyl group.

The lower alkanoyl groups represented by X are the acyl moieties derived from lower fatty acids containing alkyl groups of the character described above and include, for example, acetyl, propionyl, butyryl and the like.

The cycloalkyl groups represented by R are saturated alicyclic groups, containing preferably 3 to 7 carbon atoms including for example, cyclopropyl, cyclobutyl, cyclopentyl, cyclohexyl and cycloheptyl.

R represents a phenyl group or a phenyl group which contains one to three substituents represented by the symbol X. Illustrative of the substituted phenyl groups are the following: o-, m-, and p-chlorophenyl, o-, m- and p-bromophenyl, o-, m- and p-nitrophenyl, 3,4-dinitrophenyl, 2,3-dichlorophenyl, 2,3-dibromophenyl, 3,4-dichlorophenyl, o-, m- and p-hydroxyphenyl, o-, m- and p-tolyl, o-, m- and p-xylyl, mesityl, p-methoxyphenyl, p-ethoxyphenyl, p-acetylphenyl, o-, m- and p-trifluoromethylphenyl, o-, m- and p-trichloromethylphenyl, 3,4-di(trifluoromethyl)phenyl and the like.

$R^1$ represents aralkyl groups which include mono- and bicyclic hydrocarbon rings attached to alkyl groups especially up to 12 carbon atoms. Preferably, this symbol represents $(X)_m$-phenyl-lower alkyl wherein $(X)_m$-phenyl and lower alkyl are the same as described above and this includes for example, benzyl, phenethyl, nitrobenzyl, chlorobenzyl, bromobenzyl, dichlorobenzyl, methylbenzyl and the like.

The basic nitrogen containing radicals symbolized by B may be represented by the formula (II) 

wherein each $R^3$ represents hydrogen, lower alkyl, hydroxy-lower alkyl, phenyl-lower alkyl and N-(lower alkyl)phenyl (lower alkyl) forming such basic groups as amino, lower alkylamino e.g. methylamino, ethylamino, di(lower alkyl)amino, e.g. dimethylamino, diethylamino, dipropylamino, (hydroxy-lower alkyl)amino, e.g. hydroxyethylamino, di(hydroxy-lower alkyl)amino, e.g. di(hydroxyethyl)amino, phenyl(lower alkyl)amino, e.g. benzylamino, phenethylamino, N-(lower alkyl)-phenyl (lower alkyl)amino, e.g. N-methylbenzylamino, and the like.

In addition the nitrogen may join with the groups represented by $R^3$ to form a 5 to 7 membered monocyclic heterocyclic containing, if desired, an oxygen, sulfur or an additional nitrogen atom (not more than two hetero atoms altogether), that is, the two symbols $R^3$ represent together tetramethylene, pentamethylene, hexamethylene, oxapentamethylene, oxatetramethylene, azahexamethylene, azatetramethylene, azapentamethylene, thiapentamethylene or thiatetramethylene. The heterocyclic group may also be substituted by one or two groups represented by X.

Thus heterocyclic groups represented by B include, for example piperidino, (lower alkyl)piperidino, e.g. methylpiperidino, di(lower alkyl)piperidino, e.g. dimethylpiperidino, (lower alkoxy)piperidino, e.g. methoxypiperidino, 2-, 3- or 4-piperidyl, 2-, 3- or 4-(lower alkylpiperidyl), e.g. 2-, 3- or 4-(N-methylpiperidyl), pyrrolidino, (lower alkyl)pyrrolidino, e.g. methylpyrrolidino, di(lower alkyl) pyrrolidino, e.g. dimethylpyrrolidino, (lower alkoxy) pyrrolidino, e.g. ethoxypyrrolidino, 2- or 3-pyrrolidyl, 2- or 3-(N-lower alkylpyrrolidyl), e.g. 2- or 3-(N-methylpyrrolidyl), morpholino, (lower alkyl)morpholino, e.g. N-methylmorpholino or 2-methylmorpholino, di(lower alkyl)morpholino, e.g. 2,3-dimethylmorpholino, (lower alkoxy)morpholino, e.g. ethoxymorpholino, thiamorpholino, (lower alkyl)thiamorpholino, e.g. N-methylthiamorpholino or 2-methylthiamorpholino, di(lower alkyl) thiamorpholino, e.g. 2,3-diethylthiamorpholino, 2,3-dimethylthiamorpholino, (lower alkoxy)thiamorpholino, e.g. 2-methoxythiamorpholino, piperazino, (lower alkyl) piperazino, e.g. $N^1$-methylpiperazino, 2-methylpiperazino or $N^1$-methylpiperazino, di(lower alkyl)piperazino, e.g. 2,3-dimethylpiperazino, hexamethyleneimino and homopiperazino.

The preferred members of the class defined by Formula I are those wherein X is hydrogen and Y is lower alkylene or low alkenylene, especially the latter and particularly with 2 or 3 carbon atoms, R is hydrogen or phenyl, especially the latter, $R^1$ is hydrogen or lower alkyl, especially, lower alkyl and methyl in particular, B is di-lower alkylamino, dimethylamino, diethylamino or piperidino, especially, dimethylamino, $m$ represents 1, $n$ represents 1 and the alkylene group has 2 or 3 carbon atoms, especially 2.

The compounds of Formula I may be produced by reacting an o-nitrophenyl acyl halide of the formula (III)

$$(X)_m\text{—}C_6H_3(NO_2)\text{—}(CH_2)_n\text{—}C(O)\text{—hal}$$

with a diamine of the formula (IV)

$$\text{HN}(R^1)\text{-alkylene-B}$$

which forms an intermediate of the formula (V)

$$(X)_m\text{—}C_6H_3(NO_2)\text{—}(CH_2)_n\text{—}C(O)\text{—}N(R^1)\text{-alkylene-B}$$

This reaction is preferably effected in an inert organic solvent such as chloroform, benzene, toluene, ether or the like at a temperature from about room temperature to reflux temperature. Usually the product is obtained as the acid salt and the base may be liberated by treatment with a base such as sodium hydroxide.

The nitro group is then reduced to the amino group, e.g. by catalytically hydrogenating under pressure in the presence of a metal hydrogenation catalyst such as platinum or palladium.

The o-amino compound thus obtained is finally reacted with a compound of the formula (VI)

$$\text{hal-}C(O)\text{—}(Y)_n\text{—R}$$

preferably in an inert organic solvent such as those described above at room or elevated temperature, e.g. up to about reflux temperature.

This series of reactions yields compounds of Formula I wherein $R^2$ is hydrogen. For the preparation of products of that formula wherein $R^2$ is other than hydrogen, a modification of the above procedure is required. In that instance, the amino compound obtained by reduction of the intermediate of Formula V is interacted with an aldehyde of the formula (VII)        $R^2$—CHO This yields an intermediate of the formula (VIII)

$$(X)_m\text{—}C_6H_3(N=CH\text{—}R^2)\text{—}(CH_2)_n\text{—}C(O)\text{—}N(R^1)\text{-alkylene-B}$$

On treatment with sodium borohydride or by catalytic hydrogenation, this intermediate is reduced to (IX)

$$(X)_m\text{—}C_6H_3(NH\text{—}CH_2\text{—}R^2)\text{—}(CH_2)_n\text{—}C(O)\text{—}N(R^1)\text{-alkylene-B}$$

The final step, reaction with VI, is the same as that described above.

The symbols in all of the above formulas have the same meaning and hal refers to halogen, preferably chlorine or bromine.

The bases of Formula I form acid addition salts by reaction with the common inorganic and organic acids. Such inorganic salts as the hydrohalides, e.g., hydrobromide, hydrochloride, hydroiodide, sulfates, nitrates, phosphates, borates, etc., and organic salts as acetate, oxalate, tartrate, malate, citrate, succinate, benzoate, ascorbate, salicylate, theophyllinate, camphorsulfonate, alkanesulfonate, e.g. methanesulfonate, arylsulfonate, e.g. benzenesulfonate, toluenesulfonate and the like are also within the scope of the invention. It is frequently convenient to effect the purification of the product by forming the acid salt. The base may be obtained therefrom by neutralization with an alkali hydroxide such as sodium hydroxide.

The bases of Formula I also form quaternary ammonium salts, e.g. lower alkyl halides such as methyl chloride, methyl bromide, ethyl chloride, etc., lower alkyl sulfates such as methyl sulfate, ethyl sulfate, etc., monocyclic aryl (lower alkyl) halides and sulfates such as benzyl chloride, benzyl sulfate, etc. This is accomplished by reacting the base with the alkyl halide, sulfate, or the like.

The compounds of this invention are therapeutically active substances which possess serotonin inhibitory and hypotensive activities. They are useful in the treatment of conditions such as hypertension. They may be administered orally or parenterally in the form of tablets, capsules, elixirs, injectables or the like by incorporating the appropriate dosage of the base of Formula I or a physiologically acceptable acid addition salt or quaternary ammonium salt thereof in a conventional vehicle according to accepted pharmaceutical practice.

The following examples are illustrative of the invention. All temperatures are expressed on the centigrade scale.

EXAMPLE 1

2'-[N-(2-dimethylaminoethyl)-N-methylcarbamoyl]-cinnamanilide hydrochloride (A) PREPARATION OF N-(2-DIMETHYLAMINOETHYL)-N-METHYL-o-NITROBENZAMIDE To a cold solution of 58.7 g. of o-nitrobenzoyl chloride in 150 ml. of chloroform is added dropwise a solution of 30.7 g. of N,N,N'-trimethylethylenediamine in 75 ml. of chloroform. The mixture is stirred for one hour at room temperature, refluxed for 90 min., cooled and diluted with 400 ml. of ether to give 77.8 g. of the hydrochloride salt, M.P. 172–175°. Part of this material (55 g.) is dissolved in 150 ml. of cold water and treated with a solution of 10 g. of sodium hydroxide in 25 ml. of water. The liberated base is extracted three times with ether, dried over magnesium sulfate and the solvent evaporated to give 44 g. of a yellow oil.

(B) PREPARATION OF 2-AMINO-N-(2-DIMETHYLAMINOETHYL)-N-METHYLBENZAMIDE

A solution of 44 g. of this material from part (A) in 150 ml. of absolute alcohol is treated with a suspension of 5 g. of 5% palladium on carbon and the mixture placed under three atmospheres of hydrogen. After completion of the hydrogen consumption, the mixture is allowed to cool, filtered and the solvent evaporated from the filtrate. Distillation of the residue gives 23.8 g. of product; B.P. 141–144° (0.1. mm.). This material is triturated with 200 ml. of ether. Evaporation of the solvent yields the product as a solid, M.P. 60–65°.

(C) PREPARATION OF 2' - [N - (2 - DIMETHYLAMINOETHYL) - N - METHYLCARBAMOYL] CINNAMANILIDE HYDROCHLORIDE

A cold solution of 9.9 g. of cinnamoyl chloride in 100 ml. of chloroform is stirred and treated dropwise with a solution of 13.0 g. of material from part (B) in 50 ml. of chloroform. The mixture is stirred for one hour, refluxed for one hour, cooled and diluted with 350 ml. of ether. The solid is filtered, triturated with 175 ml. of hot acetonitrile, filtered and the cooled filtrate diluted with 350 ml. of ether to give a colorless solid, M.P. 179–184°.

After recrystallization from isopropyl alcohol-ether and then acetonitrile, the product melts at 183–185°. Neutralization of the hydrochloride salt thus obtained with dilute sodium hydroxide yields the free base.

EXAMPLE 2

*2'-[N-(3-diethylaminopropyl)carbamoyl]-cinnamanilide hydrochloride*

By substituting an equivalent quantity of N,N-diethyltrimethylenediamine for the N,N,N'-trimethylethylenediamine in part (A) and following the procedure of Example 1, 2'[N - (3 - diethylaminopropyl)carbamoyl]cinnamanilide hydrochloride and the free base are prepared.

EXAMPLE 3

*2'[N-(2-dimethylaminoethyl)-N-methylcarbamoylmethylene]cinnamanilide hydrochloride*

By substituting an equivalent quantity of o-nitrophenylacetyl chloride for o-nitrobenzoyl chloride in part (A) and following the procedure described in Example 1, 2-[N-(2-dimethylaminoethyl)-N-methylcarbamoylmethylene]cinnamanilide hydrochloride and the free base are prepared. Similarly by substitution of N,N,N'-trimethylethylenediamine in part (A) of Example 1 by N,N'-dimethyl-N-phenethylethylenediamine, 2 - (4-morpholino)-ethylamine and 3-(1-methyl-4-piperazinyl) propylamine, there are obtained, respectively, 2'-(N-[2-(N-methyl-N-phenethylamino) ethyl]-N'-methylcarbamoyl)cinnamanilide hydrochloride, 2'(N-[2-(4-morpholino)ethyl] carbamoyl)cinnamanilide hydrochloride and 2'(N-[3-(1-methyl - 4 - piperazinyl) propyl[carbamoyl)cinnamanilide hydrochloride.

EXAMPLE 4

*5'-chloro-2'-[N-(2-dimethylaminoethyl)-N-methylcarbamoyl]cinnamanilide hydrochloride*

By substitution of an equivalent quantity of 5-chloro-2-nitrobenzoylchloride for the o-nitrobenzoylchoride in part (A) and following the procedure of Example 1, 5'-chloro-2'-[N-(2 - dimethylaminoethyl)-N-methylcarbamoyl]-cinnamanilide hydrochloride is prepared.

EXAMPLE 5

*2'[N-2-dimethylaminoethyl)-N-methylcarbamoyl] acetanilide hydrochloride*

By substitution of an equivalent quantity of acetyl chloride for cinnamoyl chloride in part (C) of Example 1, 2' - [N-(2-dimethylaminoethyl)-N-methylcarbamoyl] acetanilide hydrochloride is prepared. Similarly by substituting for cinnamoyl chloride benzoyl chloride, hexahydrobenzoyl chloride, phenacetyl chloride, sorboyl chloride phenylpropiolyl chloride, α-methylcinnamoyl chloride and furoyl chloride gives, respectively, 2'[N-(2-dimethylaminoethyl) - N - methylcarbamoyl]benzanilide hydrochloride, 2'-[N-(2-dimethylaminoethyl)-N-methylcarbamoyl]hexahydrobenzanilide hydrochloride, 2'[N-(2-dimethylaminoethyl) - N-methyl carbamoyl]phenacetanilide hydrochloride, 2' - [N-(2-dimethylaminoethyl)-N-methyl carbamoyl]sorbanilide hydrochloride, 2'-[N-(2-dimethylaminoethyl)-N-methyl-carbamoyl]phenylpropiolylanilide hydrochloride, 2'[N-(2-dimethylaminoethyl)-N-methyl carbamoyl]-α-methylcinnamanilide hydrochloride, and 2'-[N-(2-dimethylaminoethyl)-N-methyl carbamoyl] furanilide hydrochloride.

EXAMPLE 6

*2'[N-(2-dimethylaminoethyl)-N-methyl carbamoyl]-p-methoxycinnamanilide hydrochloride*

This material is prepared by substitution of an equivalent quantity of p-methoxycinnamoyl chloride for the cinnamoyl chloride in part (C) of Example 1.

EXAMPLE 7

*2'[N-(2-dimethylaminoethyl)-N-methyl carbamoyl]-N'-benzylcinnamanilide hydrochloride*

(A) PREPARATION OF 2-BENZYLAMINO-N-(2-DIMETHYLAMINOETHYL)-N-METHYLBENZAMIDE

A mixture of 22 g. of material from part (B) of Example 1 and 10.6 g. of benzaldehyde is heated at 100° for one hour, cooled and dissovled in 150 ml. of ethanol. The solution is treated with 3 g. of 5% palladium carbon and placed under three atmospheres of hydrogen until the absorption of hydrogen ceases. The mixture is filtered and the solvent is removed under reduced pressure to give the product.

(B) PREPARATION OF 2' - [N - (2 - DIMETHYLAMINOETHYL)-N-METHYLCARBAMOYL] - N' - BENZYLCINNAMANILIDE HYDROCHLORIDE

The material from part (A) is dissolved in 100 ml. of chloroform and added dropwise to a cold solution of 16.7 g. of cinnamoyl chloride in 200 ml. of chloroform. The reaction mixture is stirred for one hour at room temperature, refluxed for one hour, cooled and diluted with 500 ml. of ether to give a crystalline product.

EXAMPLE 8

*2'-[N-(2-dimethylaminoethyl)-N-methylcarbamoyl] cinnamanilide methochloride*

A solution of 10.0 g. of material from part (C) of Example 1 is treated with a solution of 1.0 g. sodium hydroxide in 5 ml. of water. The base is extracted with 100 ml. portions of ether and ether extracts dried over magnesium sulfate. The solvent is evaporated and the residue is dissolved in 100 ml. of acetonitrile, cooled and treated with 10 g. of methyl chloride. After standing at room temperature for a day, the solution is diluted with 500 ml. of ether to give a crystalline product.

What is claimed is:
1. A compound of the group consisting of a base of the formula

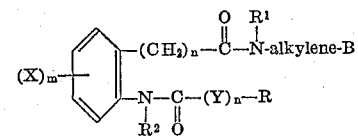

wherein the alkylene group has up to about 14 carbon atoms, R represents a member of the group consisting of hydrogen, lower alkyl, cycloalkyl of 3 to 7 carbon atoms, $(X)_m$-phenyl, furyl, thienyl, pyridyl and piperomyl, $R^1$ and $R^2$ each represent a member of the group consisting of hydrogen, lower alkyl, lower alkenyl and aralkyl up to 12 carbon atoms, X represents a member of the group consisting of hydrogen, halo, lower alkyl, lower alkoxy, lower alkanoyl, trihalomethyl, hydroxy and nitro, Y represents a member of the group consisting of lower alkylene, lower alkenylene, lower alkynylene and lower alkadienylene, B represents a basic, nitrogen containing radical of the group consisting of

and N-hetero-$(X)_n$ wherein $R^3$ is a member of the group consisting of hydrogen, lower alkyl, hydroxy-lower alkyl, phenyl-lower alkyl and N-(lower alkyl)phenyl (lower alkyl), hetero is a divalent radical of the group consisting of tetramethylene, pentamethylene, hexamethylene, oxapentamethylene, oxatetramethylene, azahexamethylene, azatetramethylene, azapentamethylene, thiapentamethylene and thiatetramethylene, and X has the meaning previously defined, m represents an integer from 1 to 3 and n represents an integer for 0 to 2, and physiologically acceptable acid addition salts and quaternary ammonium salts of said base.

2. A compound of the formula

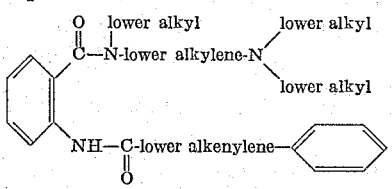

3. A physiologically acceptable acid addition salt of a compound of claim 2.

4. A compound of the formula

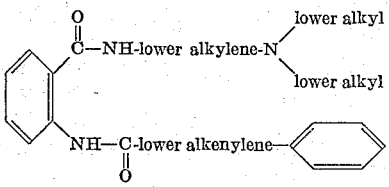

5. 2'-[N-(2-dimethylaminoethyl)-N-methylcarbamoyl]cinnamanilide.
6. 2' - [N-(3-diethylaminopropyl)carbamoyl]cinnamanilide.
7. 2'-[N-(2-dimethylaminoethyl)-N-methylcarbamoylmethylene]cinnamanilide.

References Cited by the Examiner

UNITED STATES PATENTS

| | | | |
|---|---|---|---|
| 2,852,556 | 9/58 | Katz et al. | 260—558 X |
| 3,043,676 | 7/62 | Lemin | 260—558 X |

FOREIGN PATENTS 210,170   10/55   Australia.

IRVING MARCUS, *Primary Examiner.*
D. T. McCUTCHEN, WALTER D. MODANCE,
*Examiners.*